Patented May 29, 1934

1,960,917

UNITED STATES PATENT OFFICE 1,960,917

PROCESS OF TREATING COAL

Adriaan Nagelvoort, Wilmington, Del., assignor to Delaware Chemical Engineering Company, Wilmington, Del., a corporation of Delaware No Drawing. Application September 9, 1932, Serial No. 632,467

4 Claims. (Cl. 44—6)

This invention relates to processes of treating coal; and it comprises a method of removing excess water or moisture from coal sprayed with water on the breakers, wherein coal carrying water is sprayed with an aqueous oil emulsion in sufficient amount to film the coal particles with adhering oil and cause clinging water to drain away; said method being also applicable to drying wet coal in other relations and to drying wet minerals having greater affinity for oil than for water; all as more fully hereinafter set forth and as claimed.

In the preparation of coal for market it is generally the practice to wash and spray it with water before and during its passage through the breakers. This is done to separate dirt, gangue, etc. present with the raw coal, to separate fines and to keep down dust during handling. The coal becomes thoroughly wetted; much of the water being retained against drainage. Half-inch coal coming from the breakers may retain as much as 12 per cent water. It is commercially objectionable in coal to be shipped, handled and used to have above 3.5 per cent by weight of moisture present. Removing the wetting water from coal in the colliery is an important technical problem. Some, but not all, of the excess water can be removed by drainage on screens or by passage over shakers before shipping and storing. These methods, however, do not produce a commercial air dry coal with not more than, say, 3.5 per cent water. For this reason the more expensive procedure of special air drying treatments is often resorted to after the material has drained as far as possible on the screens.

Much water is not permissible in coal to be shipped for obvious reasons, among them that of the excess weight. There is also the further objection that in shipping coal in cold weather the contents of a car may freeze to a solid mass in the gondola. In dry weather the excess water evaporates in shipment at least to a large extent, but the evaporation is apt to be from the exposed top of the load. Coal drying out in shipment or in the bins and then becoming rewetted by rain also develops difficulties since there is a tendency of the coal to shatter and break down with excessive formation of fines.

To avoid this formation of fines and also to avoid dust, air dry coal is often treated with materials of a more or less hygroscopic nature, molasses, waste sulfite liquor, calcium chlorid solution, etc. Unfortunately, these substances cannot be advantageously added to wet coal, as they have been found to have a deleterious, disintegrating effect on coal; perhaps by breaking down gels of a more or less hydrated nature forming a constituent part of the coal.

In the present invention I have obviated the stated disadvantages and gained certain new advantages. In this invention I utilize the fact that in an emulsion of oil in water, coal is preferentially wetted by the oil; the coal develops an adsorbed film of oil which puts it out of contact with water. The oil in suspension in the water leaves the water to adhere to the coal. I therefore spray coal with a dilute oil emulsion; one containing a small amount of oil dispersed in a relatively large amount of water. In so spraying wet coal on the breakers the excess water of the emulsion drains away and so does the clinging water on the coal. There is the unexpected result, when wet coal is sprayed on the final breaker with an oil emulsion, instead of water, that the coal at once drains dry. In the present invention I contemplate accomplishing this result by passing coal through the regular breaker system and under the usual water sprays to achieve the usual results of wetting down the coal and then spraying the wet coal with an oil emulsion.

Wet coal sprayed with oil emulsion and then drained is practically air dry coal and it may be shipped, stored and sold as such. There is the further advantage that the presence of the oil on the surface of the coal prevents further wetting by rain. The drained coal stays drained. The amount of oil used in the present invention is not enough to affect the fuel value of the coal substantially; it is not my object to qualify the combustible value of the coal by adding oil.

The oil spraying is advantageously applied to the coal at the colliery immediately after final washing. But, if circumstances render it desirable the spraying may be applied during sizing or crushing or during or before any of the intermediate steps since it interferes with no other operation than that of wetting down the coal.

I find in spraying wet coal with oil emulsions on screens that to spray immediately after, or during passage over, the usual dewatering screens gives the quickest and most effective results. Under these circumstances the coal seems to eject water in the form of droplets adhering slightly to the oil surface. If there is too much adhesion and ready and quick drainage does not occur these drops of water may be removed by passing the coal over a screen of suitable mesh provided on its underside with a plurality of small rollers. In some way, this causes the water to drop off. Adhering droplets may also be removed by shaking the coal in any of the shakers of well known design and construction. A blast of air or suction may be applied.

The oil used in the present processes may be any one which readily emulsifies with a large amount of water. All oils seem to leave water for the coal quite readily. Oils of petroleum origin, various vegetable oils and animal oils may be used. Petroleum oils are satisfactory and cheap. Oils of the grades known as kerosene and solar oil may be used. Any suitable emulsifying or dispersing agent such as, soap, may be used.

While I have hereinbefore described this invention more particularly in its use in facilitating the drainage of wet coal, it may also be applied to draining any wet metallic ores. Most of these metallic ores, like coal, show a preferential wetting with oil. For example, wet sulfid ores may be so dried.

What I claim is:

1. In treating lump coal the method comprising washing the coal, whereby the coal becomes wet with water, thereafter spraying said wet coal with an emulsion of oil in water and draining.

2. The process of treating minerals preferentially wet by oil comprising washing said minerals with water, thereafter spraying said wet minerals with an emulsion of oil in water and draining.

3. In removing water from wet lump coal the method which comprises spraying said wet coal with an emulsion of oil in water and thereafter agitating and draining.

4. In the process of treating lump coal by washing, the steps which comprise spraying water-wet coal with an emulsion of oil in water and draining, whereby adherent water is removed from said wet coal.

ADRIAAN NAGELVOORT.